United States Patent
Gacek et al.

(10) Patent No.: US 12,452,245 B1
(45) Date of Patent: Oct. 21, 2025

(54) CREATING ACCESS CONTROL POLICIES FROM ACCESS REQUEST EVENT LOGS

(71) Applicant: Amazon Technologies, Inc., Seattle, WA (US)

(72) Inventors: Andrew Jude Gacek, Maple Grove, MN (US); Chase Ellis Johnson, Minneapolis, MN (US); Neha Rungta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 18/535,936

(22) Filed: Dec. 11, 2023

(51) Int. Cl.
*H04L 9/40* (2022.01)
*G06F 21/60* (2013.01)
*G06N 3/045* (2023.01)
*H04L 41/16* (2022.01)

(52) U.S. Cl.
CPC ............ *H04L 63/10* (2013.01); *G06F 21/604* (2013.01); *G06N 3/045* (2023.01); *H04L 41/16* (2013.01); *H04L 63/101* (2013.01); *H04L 63/107* (2013.01); *H04L 63/20* (2013.01)

(58) Field of Classification Search
CPC .......... G06N 3/045; G06N 3/006; G06N 3/08; G06N 20/00; H02J 3/003; H02J 3/14; G05B 13/027; G05B 13/0265; G05B 15/02; G05B 13/041; G05B 13/048; H04L 63/107; H04L 63/102; H04L 63/20; H04L 63/108; H04L 63/10; G06F 18/24155; G06F 21/6218; G06F 21/50; G06F 21/604; G06F 18/214; G06F 18/217
See application file for complete search history.

(56) References Cited

U.S. PATENT DOCUMENTS

| | | | |
|---|---|---|---|
| 8,640,190 B1 * | 1/2014 | Banerjee ............... | G06F 21/604 726/17 |
| 10,122,757 B1 * | 11/2018 | Kruse ..................... | H04L 63/10 |
| 2020/0053090 A1 * | 2/2020 | Kliger ................... | H04L 63/107 |
| 2022/0026864 A1 * | 1/2022 | Murugesan ........... | G06N 3/045 |

* cited by examiner

*Primary Examiner* — Kyung H Shin
(74) *Attorney, Agent, or Firm* — Athorus, PLLC

(57) ABSTRACT

Disclosed are systems and methods that automatically generate access control policies based on access request log entries generated for an existing endpoint. For example, existing systems that utilize authorization control logic (or no authorization control logic) can continue processing access requests as normal and produce access request log entries for each access request. The disclosed implementations process those access request log entries, for example, using a large language model, and generate an access control policy set for the endpoint that includes one or more access control policies determined from the access request log entries.

20 Claims, 11 Drawing Sheets

EXAMPLE ACCESS CONTROL POLICY
230

231 — EFFECT { allow (

232 — SCOPE {
    principal in UserRole::"member",
    action == Action::"shareItem",
    resource
)

233 — CONDITION {
when {
    resource.owner == principal
}
unless {
    resource.labels.contains("private")
}

FIG. 2

CREATING ACCESS CONTROL POLICIES FROM ACCESS REQUEST EVENT LOGS

BACKGROUND

Existing authorization systems typically utilize a rules based engine to either grant or deny access requests to information, endpoints, etc. While rule based engines work for simple systems, as businesses and access requests become more complex the authorization rules and the business logic of those systems become tightly coupled. Likewise, the Application Program Interfaces ("APIs") get cluttered with authorization logic. Still further, while newer systems provide a policy approach to authorization, such systems require that businesses with existing rule based authorization logic manually reiterate the existing authorization logic from the rules based approach to a policy approach. Likewise, businesses that do not have authorization systems in place are required to manually established either a rules based authorization logic or a policy approach. Either option hinders the ability for businesses to transition to newer policy based systems.

BRIEF DESCRIPTION OF THE FIGURES

FIG. 2 illustrates an example access control policy, generated in accordance with the disclosed implementations.

DETAILED DESCRIPTION

Disclosed are systems and methods that automatically generate access control policies based on access request log entries generated for an existing endpoint. For example, existing systems that utilize authorization control logic (or no authorization control logic) can continue processing access requests as normal and produce access request log entries for each access request.

As discussed further below, after a collection period, the disclosed implementations may process sub-sets of the access request log entries, referred to herein as a data set, for example using a Large Language Model ("LLM"), to generate candidate access control policies, rank those candidate access control policies based on a coverage percentage of access request logs included in the data set, and select a candidate access control policy with a highest coverage score as an access control policy for an access control policy set. This may be done several times to generate access control policies to include in the access control policy set that cover different access request log entries from the data set. The resulting access control policy set may then be used to monitor access requests to the endpoint and/or to allow or deny access requests based on the access control policies of the access control policy set. Still further, in some implementations, the access control policy set may be used to identify anomalies in access requests.

Figure 1A:
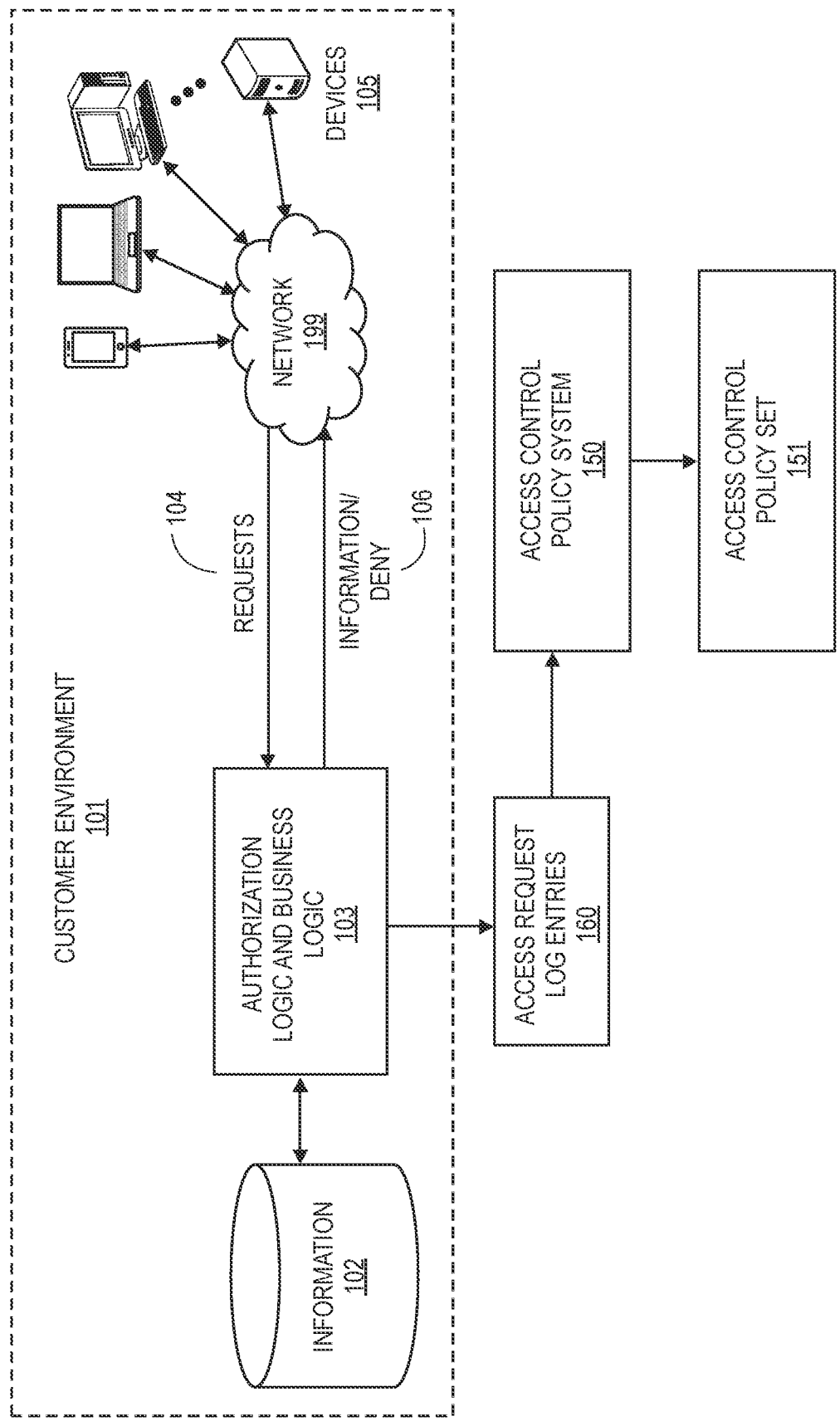
FIG. 1A is an illustration of an example customer environment that utilizes authorization logic that is coupled with business logic to determine whether to grant or deny access requests from applications executing on devices and the generation of an access control policy set that includes one or more access control policies determined from access request log entries, in accordance with disclosed implementations.

FIG. 1A is an illustration of an example customer environment 101 that utilizes authorization logic 103 that is coupled with business logic to determine whether to grant or deny access requests from applications executing on devices 105, the collection of access request log entries 160 for each access request, and the subsequent generation by an access control policy system 150 of an access control policy set 151 that includes one or more access control polies determined from the access request log entries 160, in accordance with disclosed implementations.

As illustrated, one or more authorized devices 105, such as employee devices, client devices, etc., that are executing one or more authorized applications, may generate and send requests 104 through a network 199, such as the Internet or an intranet, requesting access to information 102 or other services. In traditional systems, authorization logic 103, which is often rule based and tightly coupled with business logic, may process the access request and either provide the requested access, information, etc., or deny the access request 106. Alternatively, there may be no authorization logic 103 and any authorized device may be allowed to access any information, services, etc., of the business. In either case, access request log entries 160 may be generated for each access request that indicates the request and the resulting decision for the request (i.e., allow or deny). An example access request log entry may look like the following:

```
{
  "request": {
    "principal": "PhotoApp::User::\"JaneDoe\"",
    "action": "PhotoApp::Action::\"editPhoto\"",
    "resource": "PhotoApp::Photo::\"JaneDoe.jpg\""
  }
  "response": {"result": "Allow"};
  "entities": {
    "principal":   {
      "uid": { "type": "PhotoApp::User", "id": "JaneDoe" },
      "parents": [ . . . ],
      "attrs": { . . . }
    },
    "resource":   {
      "uid": { "type": "PhotoApp::Photo", "id": "JaneDoe.jpg" }
      "parents": [ . . . ]
      "attrs": { . . . }
    }
  }
}
```

As will be appreciated, access request control logs may be different than illustrated and the one presented herein is for exemplary purposes only. Generally, the access request logs indicate who requested what, what action they were trying to perform, what the response was, and some information around the entities related to the access request.

As illustrated and as discussed further below, after a defined collection period, which may vary by customer, by endpoint, etc., and/or which may be defined based on a collection of a minimum number of access request log entries 160 (e.g., 500,000), the access control policy system 150 may process some or all of the access request log entries 160, referred to herein as a data set, and generates an access control policy set 151 that includes one or more access control policies. The access control policy system 150 may have some predefined guidelines, such as deny by default and/or deny policies are prioritized over allow. A deny by default guideline may set forth that an access request is to be denied unless there is an access control policy that covers the access request (i.e., is applicable to the access request). Likewise, in such a deny by default environment, all policies created may be allow policies. As another example, a guideline that specifies that deny policies are prioritized over allow polies will result in an access request that is covered by two policies, one that allows the access request and one that denies the access results, being denied because the deny policy takes priority. In such environments, the policy order is irrelevant/agnostic.

FIG. 2 illustrates an example access control policy 230, generated in accordance with the disclosed implementations.

As illustrated, in accordance with disclosed implementations, an access control policy 230 includes an effect 231, a scope 232, and a condition 233. The effect 231 of an access control policy 230 can be either "allow," as illustrated, or "deny." The scope 232 of the access control policy 230 limits the effect 231 of the access control policy. In the example illustrated in FIG. 2, the scope 232 limits the effect 231 of the policy to "principal," "action," and "resource." In other examples, the policy may limit the scope to other attributes, resources, etc. Finally, the condition 233 may include any of a variety of arbitrary expression including, but not limited to, arithmetic, inequality, Internet Protocol ("IP") address conditions, etc. The semantics of the condition 233 function by evaluating the condition to a Boolean expression such that when an access request is received, if the "when" block evaluates to true and the "unless" block evaluates to false, then the policy applies to or covers the request.

In some implementations, only allow policies may be created and included in the access control policy set, which results in compositionality of the access control system when the access control policy system follows a deny by default guideline. In particular, in such a configuration, each access control policy can be evaluated in isolation to determine how accurate the access control policy is and what percentage of the data set the access control policy covers. Likewise, as discussed further below, the disclosed implementations result in the generation of limited or minimal access control policies such that the access control policy set covers as many of the access request log entries of the data set with as few access control policies. Such a configuration works well for new access requests that have not yet been received or identified in the access request log entries. In particular, with more general policies, newly identified access requests are more likely to be covered by an access control policy of the access control policy set, if it is a valid request, rather than being automatically denied.

Figure 1B:
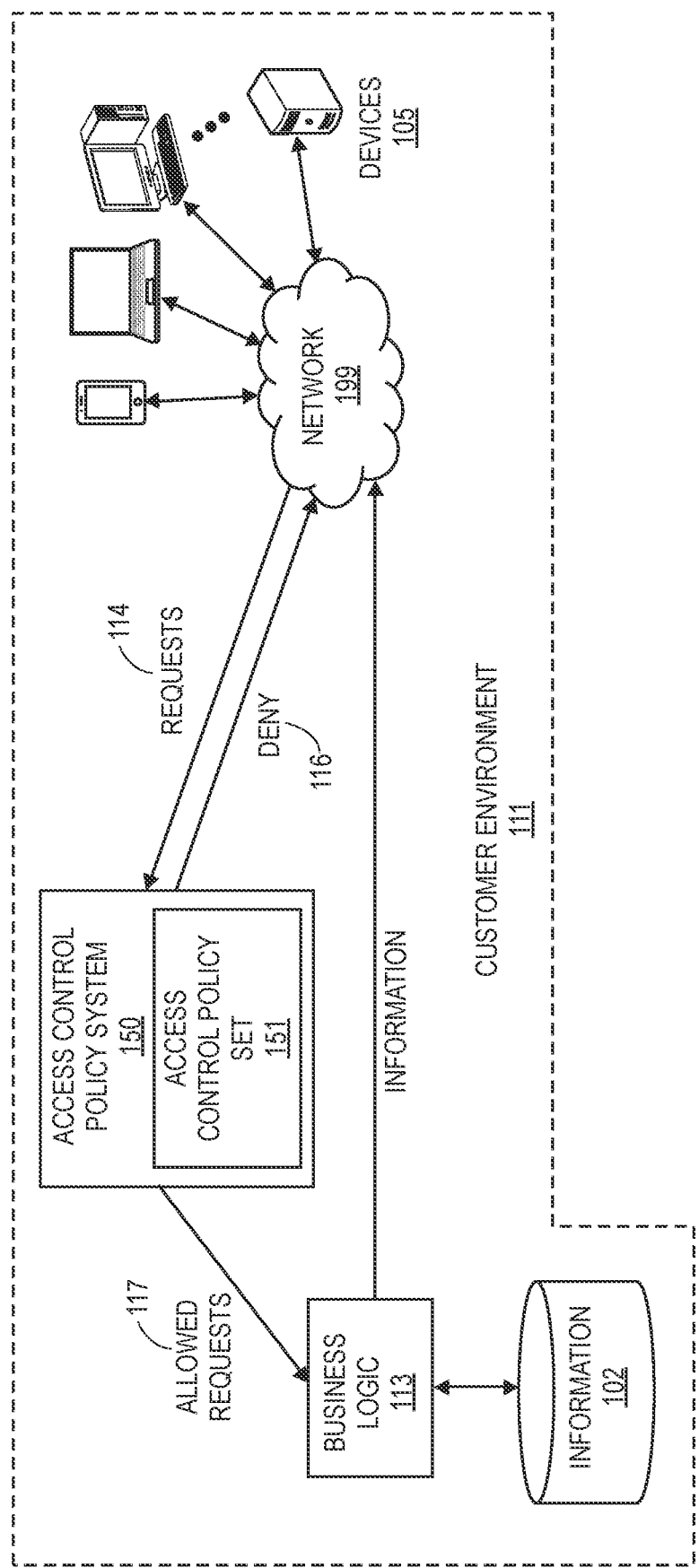
FIG. 1B is an illustration of an access control policy system that monitors and/or controls access requests utilizing access control policies determined from access request log entries, in accordance with disclosed implementations.

Upon generation of the access control policy set 151, the access control policy set 151 may be used to monitor future access requests and/or to process future access requests and allow or deny those requests. FIG. 1B is an illustration of the access control policy system 150 operating with a customer environment 111, that is utilizing the access control policy set 151 generated as discussed with respect to FIG. 1A, and as discussed further below, to monitor and/or control future access requests 114 and either deny 116 those requests or provide those requests, as allowed requests 117, to the business logic 113 so that the business logic can provide the requested access to information 102, or other resources, etc., in accordance with disclosed implementations.

As illustrated, with the disclosed implementations, an access control policy set that includes one or more access control policies can be automatically generated and utilized based on access request event logs collected from existing access requests, without requiring any manual reiteration of existing rules based authorization logic, etc. In addition, with the access control policies, anomalies in access request patterns may be quickly identified. For example, if access requests for a particular set of information begin getting denied, it may identify an anomaly in the system, a change in business structure that no longer aligns with the access control policies, etc.

Figure 3:
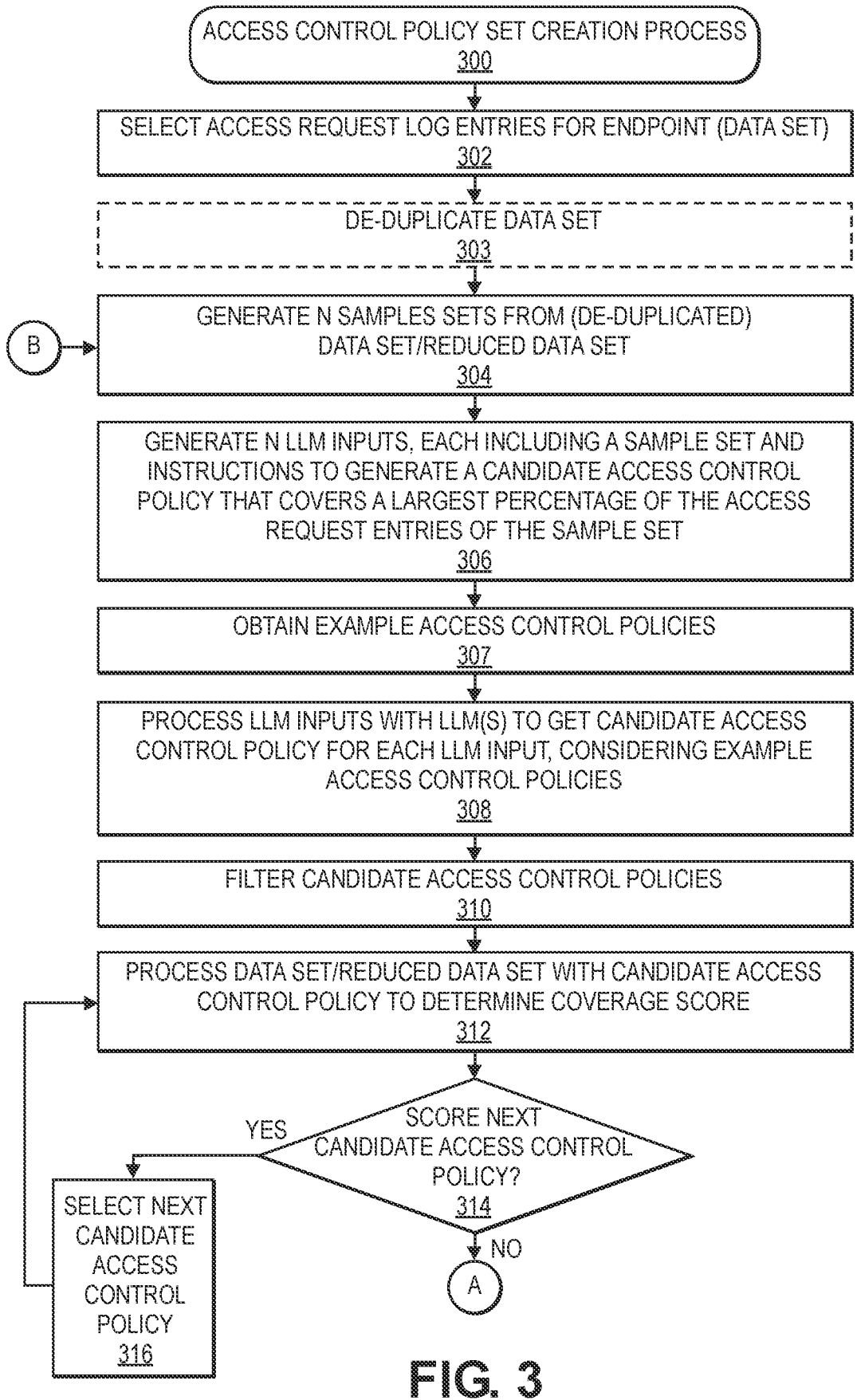
FIG. 3 is an example access control policy set creation process, in accordance with disclosed implementations.
Figure 3:
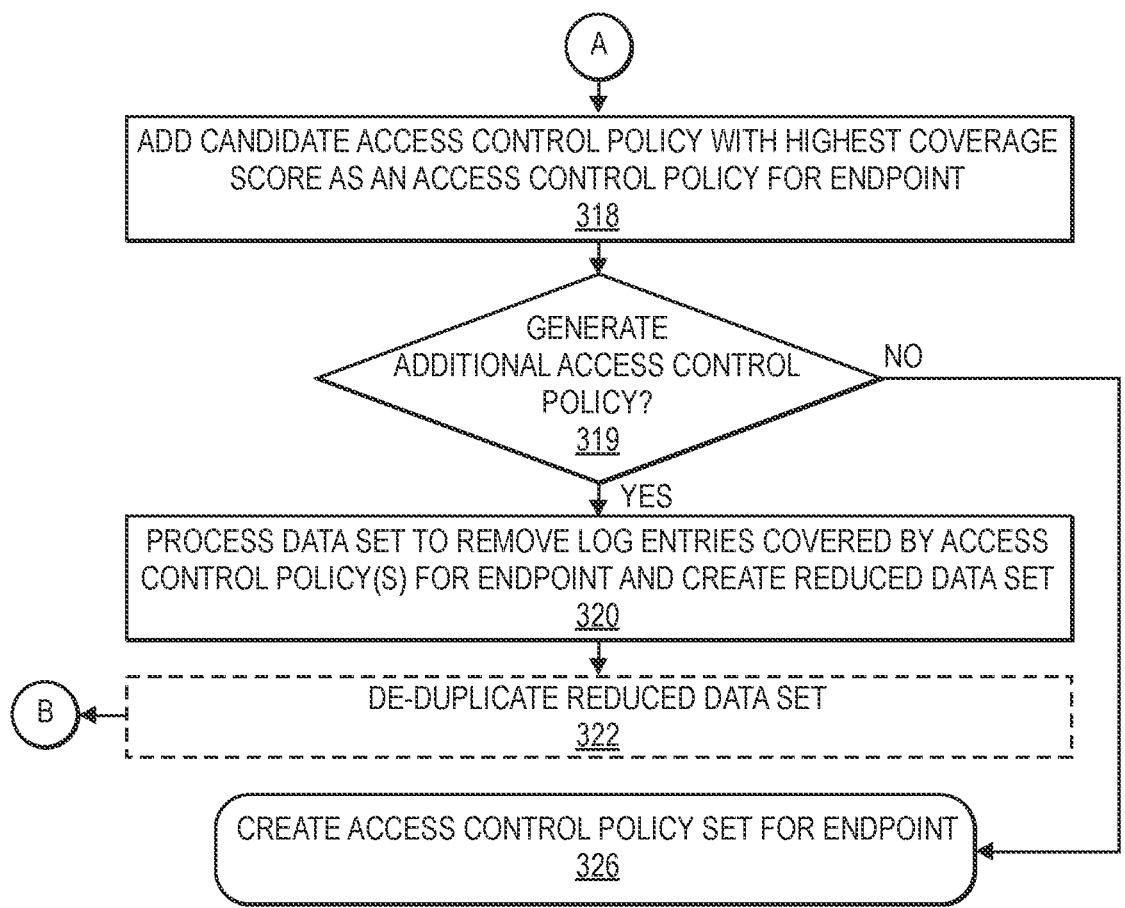

FIG. 3 is an example access controls policy set creation process 300, in accordance with disclosed implementations.

The example process 300 begins by selecting access request log entries, referred to herein as a data set, for an endpoint, as in 302. As discussed above, access request log entries may be collected into a data set, which may include one or more log files for access requests to an endpoint, such as a phone tool, a file, a photograph, employee records, bank statements, a computing infrastructure, etc. The data set may include both allow access request log entries in which the access request is allowed and deny access request log entries in which the access request is denied.

As noted above, the access request log entries may be collected for an existing system for a defined period of time and/or until a defined number of access request log entries are collected. For example, a defined number of access request log entries may be a minimum amount, such as 500,000, and the defined period of time may be two weeks. In other implementations, only one of a defined number or a defined period of time may be utilized, different defined numbers (higher or lower) may be selected, and/or the defined period of time may be longer or shorter. Regardless, the data set selected by the example process 300 will include a plurality of access request log entries.

In some implementations, the data set may optionally be de-duplicated to remove access request log entries that are substantially duplicates, as in 303. Any of a variety of techniques may be used for de-duplication and the level of similarity may be adjusted to remove only exact duplicates to ones in which only the user, access request, etc. are the same and in which the access requests were received within a defined time window, such as two hours.

Upon selecting a data set and optionally de-duplicating the data set, N number of sample sets may be generated from the data set/de-duplicated data set, with each of the N number of sample sets including a sub-plurality of access request log entries selected from the data set, wherein each of the sub-plurality of access request log entries are less than the plurality of log entries of the data set, as in 304. In some implementations, the sub-plurality may be set to a number that is less than a context window size of a LLM which, as discussed below, may process one or more of the sample sets.

Each sample set may include the same or different number of access request log entries. Likewise, in some implementations, each sample set may include different access request log entries. In other implementations, two or more of the N number of sample sets may include one or more access request log entries that are the same. Still further, in some implementations, the access request log entries for each sample set may be randomly selected from the data set.

For each of the N sample sets, an LLM input is generated that includes the sample set and instructions that the LLM generate a candidate access control policy that covers a largest percentage of the allow access request log entries included in the sample set as can be determined by the LLM without allowing any of the deny access request log entries included in the sample set, as in 306.

The example process 300 may also generate or obtain one or more example access control policies, as in 307. For example, as discussed below with respect to FIG. 5, in some implementations, an example access control policy may be generated from the data set by processing the data set with a decision tree and defining access control policies by navigating paths through the decision tree. In other examples, the example access control policies may include a defined structure and syntax that is to be followed in generating the candidate access control policy by the LLM when processing the LLM input. In other implementations, if the example process 300 has already processed through blocks 304 through 322 and generated one or more candidate access control policies and/or selected an access control policy for inclusion in the access control policy set, one or more of the previously generated candidate access control policies and/or the selected access control policy(s) may be obtained as an example access control policy.

Each of the N LLM inputs and one or more example access control policies may then be provided to the same or different LLMs and those LLMs will process the LLM input and determine a candidate access control policy based at least in part on the sample set included in the LLM input and the example access control policy, as in 307 and 308. For example, if N=2, two LLM inputs may be generated, one for each of the sample sets. A first LLM input that includes the first sample set may be provided, along with one or more example access control policies to a first LLM for processing and the first LLM will generate a first candidate access control policy. The second LLM input that includes the second sample set may be provided to the same or different LLM, along with the one or more example access control polies and the receiving LLM will generate a second candidate access control policy. For example, if the two LLM inputs are processed in parallel, they may be provided to different LLMs and the two different LLMs will process the LLM inputs independently and generate the first candidate access control policy and the second candidate access control policy, respectively. Alternatively, if the two LLM inputs are to be processed by the same LLM they may be provided in series to the same LLM.

Any of a variety of types of LLMs may be utilized to generate candidate access control policies and, in some implementations, some or all of the different LLM inputs may be sent to different types of LLMs. In other implementations, each LLM input may be sent to a same type of LLM. Example types of LLMs may include, but are not limited to, GPT-3, GPT-3.5, ChatGPT-4, BERT, Claude, Cohere, Ernie, Falcon 40B, Galactica, Llama, LaMDA, Ora, Palm, etc.

In some implementations, rather than providing each LLM input to a single LLM, each LLM input may be provided to multiple different types of LLMs. For example, an LLM input that includes the first sample set may be provided, along with one or more example access control policies, to a plurality of different types of LLMs for processing and each of the plurality of different LLMs will generate a different first candidate access control policy, such that there are a first plurality of first candidate access control policies. The second LLM input that includes the second sample set may be provided to the same or different plurality of different types of LLMs, along with the one or more example access control polies, and each of the receiving plurality of LLMs will generate a different second candidate access control policy, such that there are a second plurality of second candidate access policies. For example, if the two LLM inputs are processed in parallel, they may be provided to different pluralities of different types of LLMs and each of the different LLMs will process the LLM inputs independently and generate candidate access control policies. In one example, the first LLM input may be provided to five different types of LLMs and the second LLM input may be provided to five different types of LLMs (which may be the same types or different types than the LLMs to which the first LLM input was provided). In such an example, each of the ten different LLMs may process the respective LLM inputs and generate a candidate access control policy. Because LLMs behave differently and are trained on somewhat different data, even though multiple LLMs are processing the same LLM input (e.g., the first LLM input), each of those LLMs may generate different candidate access control policies.

In still other examples, the number N of LLM inputs that are generated may be one (N=1) and that single LLM input may be sent to multiple different types of LLMs to generate different candidate access control policies.

After one or more candidate access control policies have been output for each of the N sample sets, the candidate access control policies may be filtered, as in 310. For example, a defined list of filters may be considered to determine whether one or more of the output candidate access control policies should be removed from consideration. For example, each of the output candidate access control policies may be processed to determine if any of the candidate access control policies include an invalid syntax. In one example, each candidate access control policy may be sent to the same or different LLM with instructions for the LLM to process the candidate access control policy and determine if the syntax of the candidate access control policy is correct. If a candidate access control policy is determined to include an invalid syntax, the candidate access control policy may be removed from further consideration by the example process.

As another example, each candidate access control policy may be processed against the data set to determine if any of the access requests indicated in any of the access request log entries is allowed by the candidate access control policy when the access request should be denied. For example, if the access request log entry indicates that the access request is denied but the candidate access control policy, when considering the access request, allows the access request, the candidate access control policy may be excluded from further consideration. As another example, if the candidate access control policy appears to be overbroad, it may be filtered out from further consideration. Other filtering techniques may also be utilized to filter out or remove one or more of the candidate access control policies from further consideration.

For a remaining candidate access control policy, the data set (or optionally the reduced data set) may be processed by the candidate access control policy to determine a coverage score indicating a percentage of the access request log entries that are covered by the candidate access control policy, as in 312.

A determination may then be made as to whether additional candidate access control policies remain for which a coverage score is to be calculated, as in 314. If it is determined that additional candidate access control policies remain, a next candidate access control policy is selected, as in block 316, and the example process 300 returns to block 312 and continues.

If it is determined that all remaining candidate access control policies have been scored, a candidate access request control policy with a highest coverage score is selected as an access control policy for inclusion in the access control policy set for the endpoint, as in 318. The access control policy set may include one or more access control policies.

A determination may then be made as to whether an additional access control policy is to be generated, as in 319. As discussed above, an access control policy is generated to be general and cover as much of a data set as possible, while not incorrectly allowing access requests that are to be denied. However, in some instances, multiple access control policies may need to be generated to cover a sufficient percentage of the access request logs of the data set. For example, in some implementations, it may be determined that additional access control policies are to be created and included in the access control policy set until a minimum percentage (e.g., 95%) of the allow access request log entries are covered by one or more access control policies of the access control policy set. The minimum percentage may be any defined percentage and may be different for different endpoints, different customers, etc. Likewise, in some implementations, the customer may specify the minimum percentage. In other implementations, rather than or in addition to a minimum percentage of coverage, in some implementations, it may be determined that additional access control policies are to be generated until a generated access control policy does not cover a minimum number of allow access request log entries in the data set or only covers access request log entries covered by other access control policies included in the access control policy set. As will be appreciated, any number of techniques may be utilized to determine whether an additional access control policy is to be generated.

If it is determined at decision block 319 that an additional access control policy is to be generated, the data set is processed to remove all access request log entries that are covered by one or more access control policies previously generated by the example process and included in the access control policy set, thereby generating a reduced data set that excludes access request log entries that are covered by an existing access control policy of the access control policy set and includes other access request log entries of the data set, as in 320. Likewise, in some implementations, the reduced data set may be de-duplicated, as in 322, and as discussed above with respect to block 303.

Generating a reduced data set and using that reduced data set for further processing and determination of additional access control policies results in different access control policies than those already created because the access request log entries included in the sample sets that are processed by the one or more LLMs are different than the access request log entries previously used in determining the existing access control policies.

Upon generating the reduced data set and optionally de-duplicating the reduced data set, the example process 300 returns to block 304 and continues using the reduced data set/de-duplicated reduced data set.

If it is determined at decision block 319 that an additional data set is not to be generated, the access control policy set is created for the endpoint that includes each access control policy determined by the example process 300, as in 326.

Figure 4A:
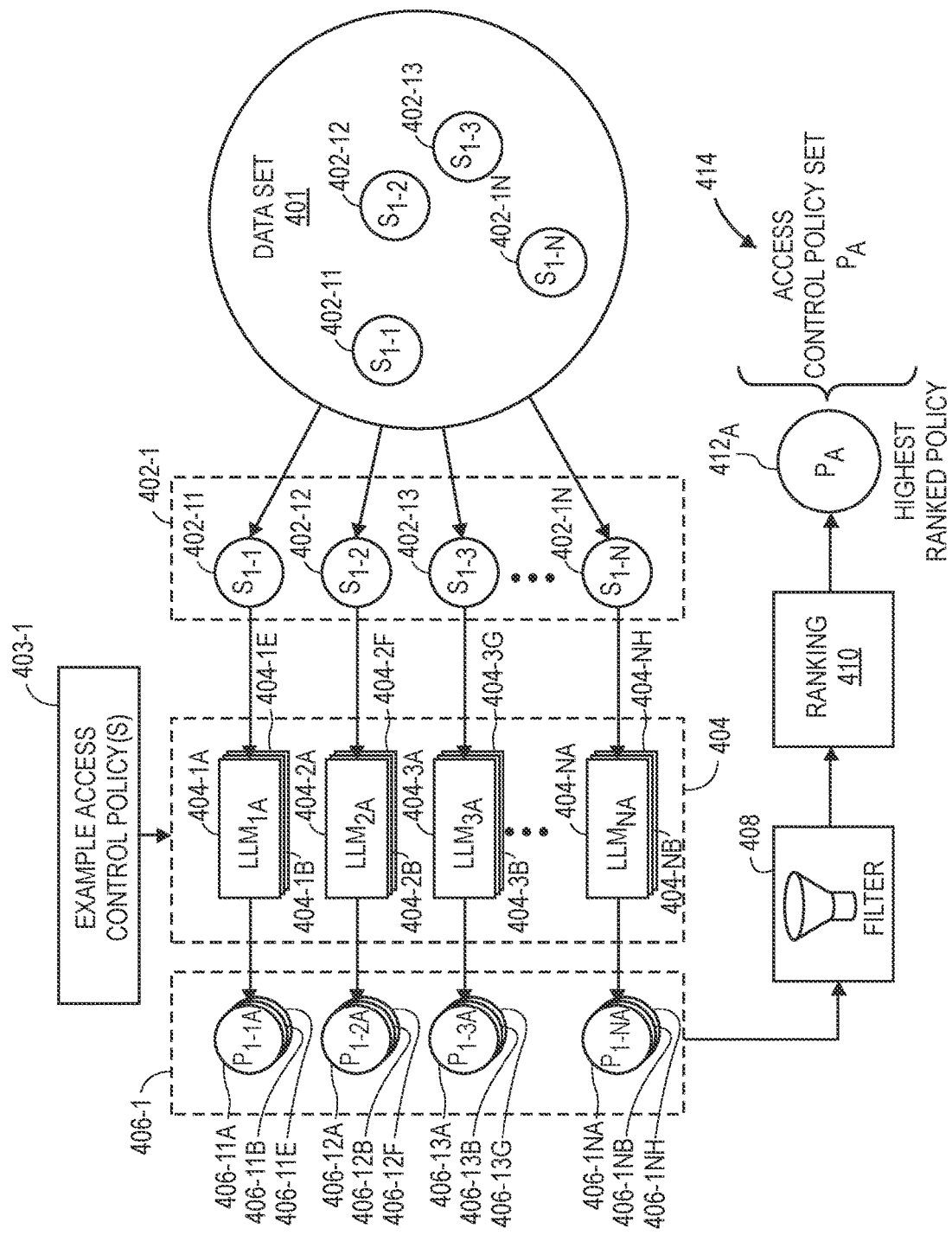
FIGS. 4A through 4C are illustrations of the creation of access control policies according to the example process discussed with respect to FIG. 3, in accordance with disclosed implementations.
Figure 4B:
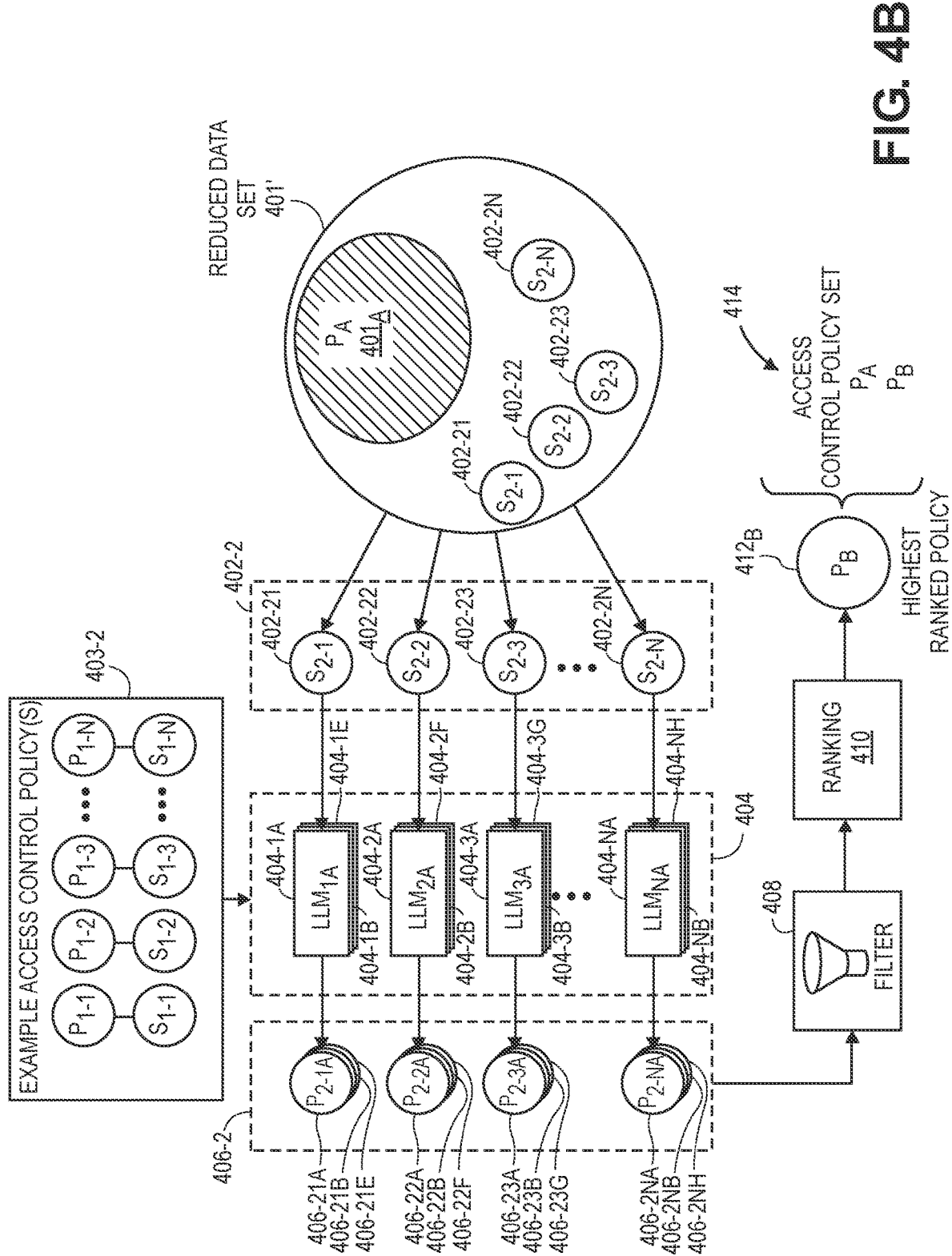
Figure 4C:
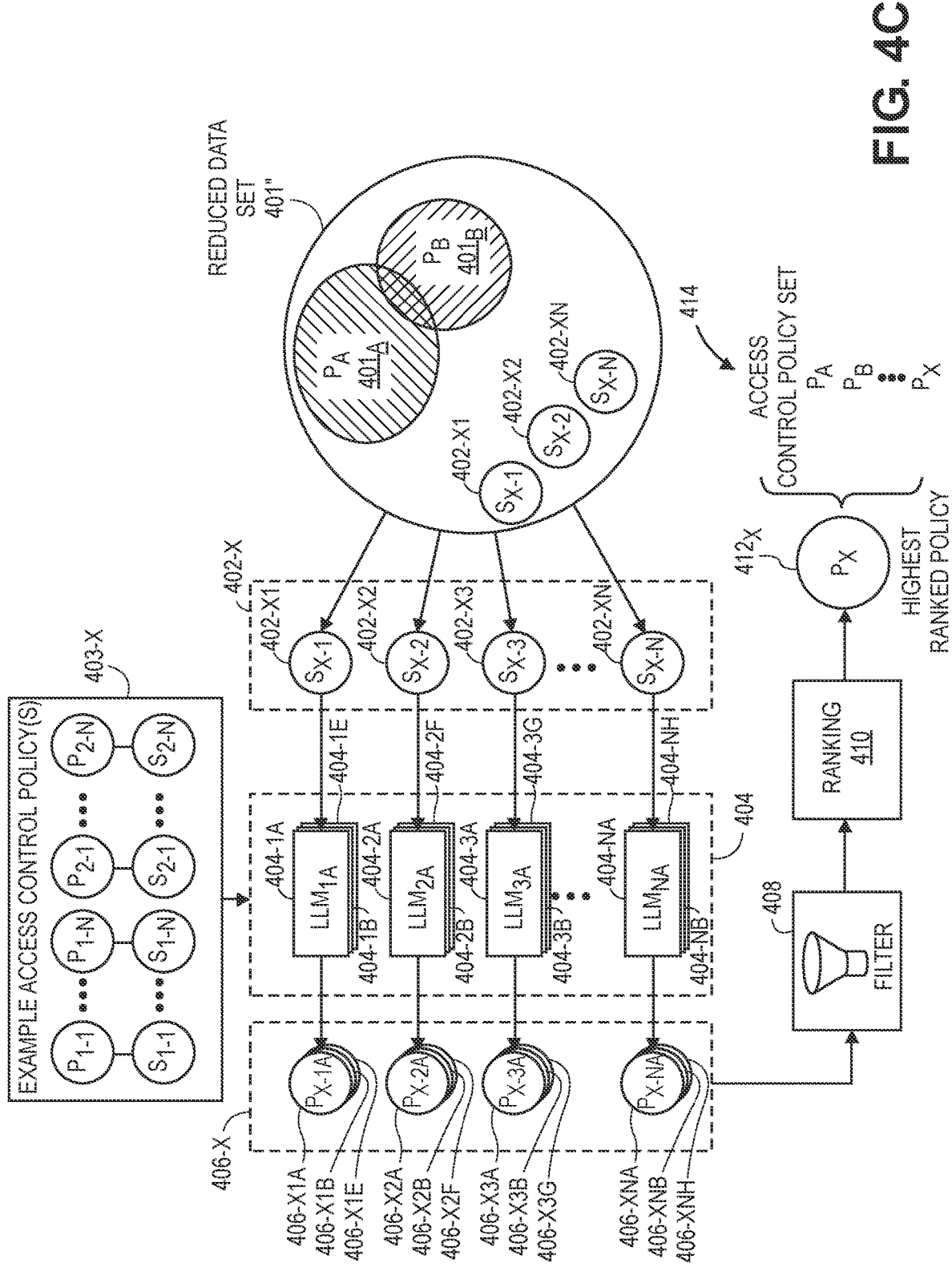

FIGS. 4A through 4C are illustrations of the creation of an access control policy set according to the example process discussed with respect to FIG. 3, in accordance with disclosed implementations. As illustrated and discussed below, FIG. 4A relates to a first pass through the example process 300 and selection of a first access control policy (PA) that is included in the access control policy set, FIG. 4B relates to a second pass through the example process 300, with a reduced data set, and selection of a second access control policy (PB) that is included in the access control policy set, and FIG. 4C relates to an Xth pass through the example process and selection of an X access control policy ($P_X$) that is included in the access control policy set.

Turning first to FIG. 4A, N number of sample sets 402-1 of access request log entries are determined from a data set 401 of access request log entries. In the illustrated example, sample sets $S_{1-1}$ 402-11, $S_{1-2}$ 402-12, $S_{1-3}$ 402-13, through $S_{1-N}$ 402-1N are selected from the data set 401. In some implementations, as illustrated, each sample set may include a different sub-set of access request log entries of the plurality of access request log entries included in the data set 401. In other implementations, there may be some overlap in the access request log entries included in the sample sets 402-1.

Each sample set may be provided to one or more LLMs, along with one or more example access control policies 403-1 and instructions or prompt to the LLM to generate a candidate access control policy 406-1 that accurately covers as many of the allow access request log entries of the sample set as possible, without allowing deny access request log entries included in the sample set. For the first pass through the LLM(s), the example access control policy(s) may be generated from the data set by processing the data set with a decision tree and defining access control policies by navigating paths through the decision tree, as discussed below with respect to FIG. 5. In other examples, the example access control policy(s) may include a defined structure and syntax that is to be followed in generating the candidate access control policy by the LLM(s) when processing the LLM input.

In the illustrated example, a first one or more LLMs 404-1A, 404-1B, through 404-1E may each process the first sample set $S_{1-1}$ 402-11, considering the one or more example access control policies 403-1, and each output a first candidate control policy 406-11A, 406-11B, through 406-11E that the first one or more LLMs 404-1A through 404-1E determine follows the structure of the example access control policy(s) 403-1 and accurately covers as many as possible of the allow access request log entries of the first sample set $S_{1-1}$ 402-11, without allowing deny access request log entries included in the first sample set. As discussed above, each of the first one or more LLMs may process the first sample set $S_{1-1}$ 402-11 independently and generate a respective first candidate access control policy based on the first sample set $S_{1-1}$ 402-11, considering the one or more example access control policies 403-1. A second one or more LLMs 404-2A, 404-2B, through 404-2F may each process the second sample set $S_{1-2}$ 402-12, considering the one or more example access control policies 403-1, and each output a second candidate control policy 406-12A, 406-12B, through 406-12F that the second one or more LLMs 404-2A through 404-2F determine follows the structure of the example access control policy(s) 403-1 and accurately covers as many as possible of the allow access request log entries of the second sample set $S_{1-2}$ 402-12, without allowing deny access request log entries included in the third sample set. As discussed above, each of the second one or more LLMs may process the second sample set $S_{1-2}$ 402-12 independently and generate a respective second candidate access control policy based on the second sample set $S_{1-2}$ 402-12, considering the one or more example access control policies 403-1. A third one or more LLMs 404-3A, 404-3B, through 404-3G may each process the third sample set $S_{1-3}$ 402-13, considering the one or more example access control policies 403-1, and each output a third candidate control policy 406-13A, 406-13B, through 406-13G that the third one or more LLMs 404-3A through 404-3G determine follows the structure of the example access control policy(s) 403-1 and accurately covers as many as possible of the access request log entries of the third sample set $S_{1-3}$ 402-13, without allowing deny access request log entries included in the third sample set. As discussed above, each of the third one or more LLMs may process the third sample set $S_{1-3}$ 402-13 independently and generate a respective third candidate access control policy based on the third sample set $S_{1-3}$ 402-13, considering the one or more example access control policies 403-1. An Nth one or more LLMs 404-NA, 404-NB, through 404-NH may each process the Nth sample set $S_{1-N}$ 402-1N, considering the one or more example access control policies 403-1, and each output an Nth candidate control policy $P_{1-N4}$ 406-1NA, 406-1NB, through 406-1NH that the Nth one or more LLMs 404-NA, 404-NB, through 404-NH determine follows the structure of the example access control policy(s) 403-1 and accurately covers as many as possible of the allow access request log entries of the Nth sample set $S_{1-N}$ 402-1N, without allowing deny access request log entries included in the Nth sample set. As discussed above, each of the Nth one or more LLMs may process the Nth sample set $S_{1-N}$ 402-1N independently and generate a respective Nth candidate access control policy based on the Nth sample set $S_{1-N}$ 402-1N, considering the one or more example access control policies 403-1.

As noted above, the first one or more LLMs 404-1A through 404-1E, the second one or more LLMs 404-2A through 404-2F, the third one or more LLMs 404-3A through 404-3G, and the Nth one or more LLMs 404-NA through 404-NH may each be the same or different types of LLM. Likewise, the quantity of LLMs included in some or all of the first one or more LLMs, the second one or more LLMs, through the Nth one or more LLMs may be the same or different.

The candidate access control policies 406-1 may then be filtered 408 to remove any candidate access control policies that should not be further considered (e.g., those that allow a request that should be denied, those that include an improper syntax, etc.). The remaining candidate access control policies may then be ranked 410 based on a coverage score determined for each of the remaining candidate access control policies. For example, each remaining candidate access control policy may process the data set 401 and determine a coverage score indicative of a percentage of access request log entries of the data set that are covered by the candidate access control policy.

Finally, a candidate access control policy with a highest coverage score may be selected as a first candidate access control policy 412A and included in the access control policy set 414.

Turning now to FIG. 4B, the data set 401 (FIG. 4A) may be reduced to exclude access request log entries 401A that are covered by the first access control policy PA 412A of the access control policy set, such that the reduced data set 401' only includes access request log entries of the data set that are not covered by the first access control policy PA 412A.

N number of sample sets 402-2 of access request log entries are then determined from a reduced data set 401' of access request log entries that are not covered by the first access control policy. In the illustrated example, sample sets $S_{2-1}$ 402-21, $S_{2-2}$ 402-22, $S_{2-3}$ 402-23, through $S_{2-N}$ 402-2N are selected from the reduced data set 401'. In some implementations, as illustrated, each sample set may include a different sub-set of access request log entries of the plurality of access request log entries included in the data set 401. In other implementations, there may be some overlap in the access request log entries included in the sample sets 402-2.

Each sample set may be provided to one or more LLMs, along with one or more example access control policies 403-2 and instructions or prompt to the LLM to generate a candidate access control policy that accurately covers as many of the allow access request log entries of the sample set as possible, without allowing deny access request log entries included in the sample set. For the second and each subsequent pass through the LLM, the example access control policy may be any one of the example access control policies generated from the data set by processing the data set with a decision tree, an example access control policy that illustrates a defined structure and syntax that is to be followed in generating the candidate access control policy, one or more of the candidate access control policies generated during a prior pass through the LLM(s), and/or one or more access control policies added to the access control policy set.

In the illustrated example, a first one or more LLMs 404-1A, 404-1B, through 404-1E may each process the first sample set $S_{2-1}$ 402-21, considering the one or more example access control policies 403-2, and each output a first candidate control policy 406-21A, 406-21B, through 406-21E that the first one or more LLMs 404-1A through 404-1E determine follows the structure of the example access control policy(s) 403-2 and accurately covers as many as possible of the access request log entries of the first sample set $S_{2-1}$ 402-21, without allowing deny access request log entries included in the first sample set. As discussed above, each of the first one or more LLMs may process the first sample set $S_{2-1}$ 402-21 independently and generate a respective first candidate access control policy based on the first sample set $S_{2-1}$ 402-21, considering the one or more example access control policies 403-2. A second one or more LLMs 404-2A, 404-2B, through 404-2F may each process the second sample set $S_{2-2}$ 402-22, considering the one or more example access control policies 403-2, and each output a second candidate control policy 406-22A, 406-22B, through 406-22F that the second one or more LLMs 404-2A, 404-2B, through 404-2F determines follows the structure of the example access control policy(s) 403-2 and accurately covers as many as possible of the access request log entries of the second sample set $S_{2-2}$ 402-22, without allowing deny access request log entries included in the second sample set. As discussed above, each of the second one or more LLMs may process the second sample set $S_{2-2}$ 402-22 independently and generate a respective second candidate access control policy based on the second sample set $S_{2-2}$ 402-22, considering the one or more example access control policies 403-2. A third one or more LLMs 404-3A, 404-3B, through 404-3G may each process the third sample set $S_{2-3}$ 402-23, considering the one or more example access control policies 403-2, and each output a third candidate control policy 406-23A, 406-23B, through 406-23G that the third one or more LLMs 404-3A through 404-3G determines follows the structure of the example access control policy(s) 403-2 and accurately covers as many as possible of the access request log entries of the third sample set $S_{2-3}$ 402-23, without allowing deny access request log entries included in the third sample set. As discussed above, each of the third one or more LLMs may process the third sample set $S_{2-3}$ 402-23 independently and generate a respective third candidate access control policy based on the third sample set $S_{2-3}$ 402-23, considering the one or more example access control policies 403-2. An Nth one or more LLMs 404-NA, 404NB, through 404-NH may each process the Nth sample set $S_{2-N}$ 402-2N, considering the one or more example access control policies 403-2, and each output an Nth candidate control policy 406-2NA, 406-2NB, through 406-2NH that the Nth one or more LLMs 404-NA through 404-NH determines follows the structure of the example access control policy(s) 403-2 and accurately covers as many as possible of the access request log entries of the Nth sample set $S_{2-N}$ 402-2N, without allowing deny access request log entries included in the Nth sample set. As discussed above, each of the Nth one or more LLMs may process the Nth sample set $S_{2-N}$ 402-2N independently and generate a respective Nth candidate access control policy based on the Nth sample set $S_{2-N}$ 402-2N, considering the one or more example access control policies 403-2.

As noted above, the first one or more LLMs 404-1A through 404-1E, the second one or more LLMs 404-2A through 404-2F, the third one or more LLMs 404-3A through 404-3G, and the Nth one or more LLMs 404-NA through 404-NH may each be the same or different types of LLM. Likewise, the quantity of LLMs included in some or all of the first one or more LLMs, the second one or more LLMs, through the Nth one or more LLMs may be the same or different.

The second set of candidate access control policies 406-2 may then be filtered 408 to remove any candidate access control policies that should not be further considered (e.g., those that allow a request that should be denied, those that include an improper syntax, etc.). The remaining candidate access control policies may then be ranked 410 based on a coverage score determined for each of the remaining candidate access control policies. For example, each remaining candidate access control policy may process the data set 401 or the reduced data set 401' and determine a coverage score indicative of a percentage of access request log entries of the data set that are covered by the candidate access control policy. In another example, a coverage score may be computed for each remaining candidate access control policy that is the percentage of the access request logs of that data set 401 that are covered by the first access control policy and/or the candidate access control policy.

Finally, a candidate access control policy with a highest coverage score may be selected as a second candidate access control policy 412B and included in the access control policy set 414.

This process of determining an additional access control policy to include in the access control policy set may be done any number of times, up through an Xth time, as illustrated by FIG. 4C. As discussed above, any of a variety of factors may be considered when determining whether to create an additional access control policy to add to the access control policy set for an endpoint.

As illustrated in FIG. 4C, the reduced data set 401' (FIG. 4B) may be further reduced to exclude access request log entries 401A that are covered by the first access control policy PA 412A of the access control policy set, to exclude access request log entries 401B that are covered by the second access control policy PB 412B of the access control policy set, and to exclude any other access request log entries that are covered by any other access control policy included in the policy set 414 such that the reduced data set 401" only includes access request log entries of the data set that are not covered by one or more access control policies of the access control policy set 414.

N number of sample sets 402-X of access request log entries are then determined from a reduced data set 401" of access request log entries that are not covered by an access control policy included in the access control policy set 414. In the illustrated example, sample sets $S_{X-1}$ 402-X1, $S_{X-2}$ 402-X2, $S_{X-3}$ 402-X3, through $S_{X-N}$ 402-XN are selected from the reduced data set 401". In some implementations, as illustrated, each sample set may include a different sub-set of access request log entries of the plurality of each access request log entries included in the reduced data set 401'. In other implementations, there may be some overlap in the access request log entries included in the sample sets 402-X.

Each sample set may be provided to one or more LLMs, along with one or more example access control policies 403-X and instructions or prompt to the LLM to generate a candidate access control policy that accurately covers as many of the allow access request log entries of the sample set as possible, without allowing deny access request log entries included in the sample set. For example, a first one or more LLMs 404-1A may each process the first sample set $S_{X-1}$ 402-X1, considering the one or more example access control policies 403-X, and each output a first candidate control policy 406-X1A, 406-X1B, through 406-X1E that the first one or more LLMs 404-1A through 404-1E determine follows the structure of the example access control policy(s) 403-X and accurately covers as many as possible of the access request log entries of the first sample set $S_{X-1}$ 402-X1, without allowing deny access request log entries included in the first sample set. As discussed above, each of the first one or more LLMs may process the first sample set $S_{X-1}$ 402-X1 independently and generate a respective first candidate access control policy based on the first sample set $S_{X-1}$ 402-X1, considering the one or more example access control policies 403-X. A second one or more LLMs 404-2A, 404-2B, through 404-2F may each process the second sample set $S_{X-2}$ 402-X2, considering the one or more example access control policies 403-X, and each output a second candidate control policy 406-X2A, 406-X2B, through 406-X2F that the second one or more LLMs 404-2A through 404-2F determine follows the structure of the example access control policy(s) 403-X and accurately covers as many as possible of the access request log entries of the second sample set $S_{X-2}$ 402-X2, without allowing deny access request log entries included in the second sample set. As discussed above, each of the second one or more LLMs may process the second sample set $S_{X-2}$ 402-X2 independently and generate a respective second candidate access control policy based on the second sample set $S_{X-2}$ 402-X2, considering the one or more example access control policies 403-X. A third one or more LLMs 404-3A, 404-3B, through 404-3G may each process the third sample set $S_{X-3}$ 402-X3, considering the one or more example access control policies 403-X, and each output a third candidate control policy 406-X3A, 406-X3B, through 406-X3G that the third one or more LLMs 404-3A, 404-3B, through 404-3G determine follows the structure of the example access control policy(s) 403-X and accurately covers as many as possible of the access request log entries of the third sample set $S_{X-3}$ 402-X3, without allowing deny access request log entries included in the third sample set. As discussed above, each of the third one or more LLMs may process the third sample set $S_{X-3}$ 402-X3 independently and generate a respective third candidate access control policy based on the third sample set $S_{X-3}$ 402-X3, considering the one or more example access control policies 403-X. An Nth one or more LLMs 404-NA, 404-NB, through 404-NH may each process the Nth sample set $S_{X-N}$ 402-XN, considering the one or more example access control policies 403-X, and each output an Nth candidate control policy 406-XNA, 406-XNB, through 406-XNH that the Nth one or more LLMs 404-NA, 404-NB, through 404-NH determine follows the structure of the example access control policy(s) 403-X and accurately covers as many as possible of the access request log entries of the Nth sample set $S_{X-N}$ 402-XN, without allowing deny access request log entries included in the Nth sample set. As discussed above, each of the Nth one or more LLMs may process the Nth sample set $S_{X-N}$ 402-XN independently and generate a respective Nth candidate access control policy based on the Nth sample set $S_{X-N}$ 402-XN, considering the one or more example access control policies 403-X.

As noted above, the first one or more LLMs 404-1A through 404-1E, the second one or more LLMs 404-2A through 404-2F, the third one or more LLMs 404-3A through 404-3G, and the Nth one or more LLMs 404-NA through 404-NH may each be the same or different types of LLM. Likewise, the quantity of LLMs included in some or all of the first one or more LLMs, the second one or more LLMs, through the Nth one or more LLMs may be the same or different.

The second set of candidate access control policies 406-X may then be filtered 408 to remove any candidate access control policies that should not be further considered (e.g., those that allow a request that should be denied, those that include an improper syntax, etc.). The remaining candidate access control policies may then be ranked 410 based on a coverage score determined for each of the remaining candidate access control policies. For example, each remaining candidate access control policy may process the data set 401 or the reduced data set 401" and determine a coverage score indicative of a percentage of access request log entries of the data set that are covered by the candidate access control policy. In another example, a coverage score may be computed for each remaining candidate access control policy that is the percentage of the access request logs of that data set 401 that are covered by one or more access control policies of the access control policy set and the candidate access control policy.

Finally a candidate access control policy with a highest coverage score may be selected as an Xth candidate access control policy 412x and included in the access control policy set 414.

Figure 5:
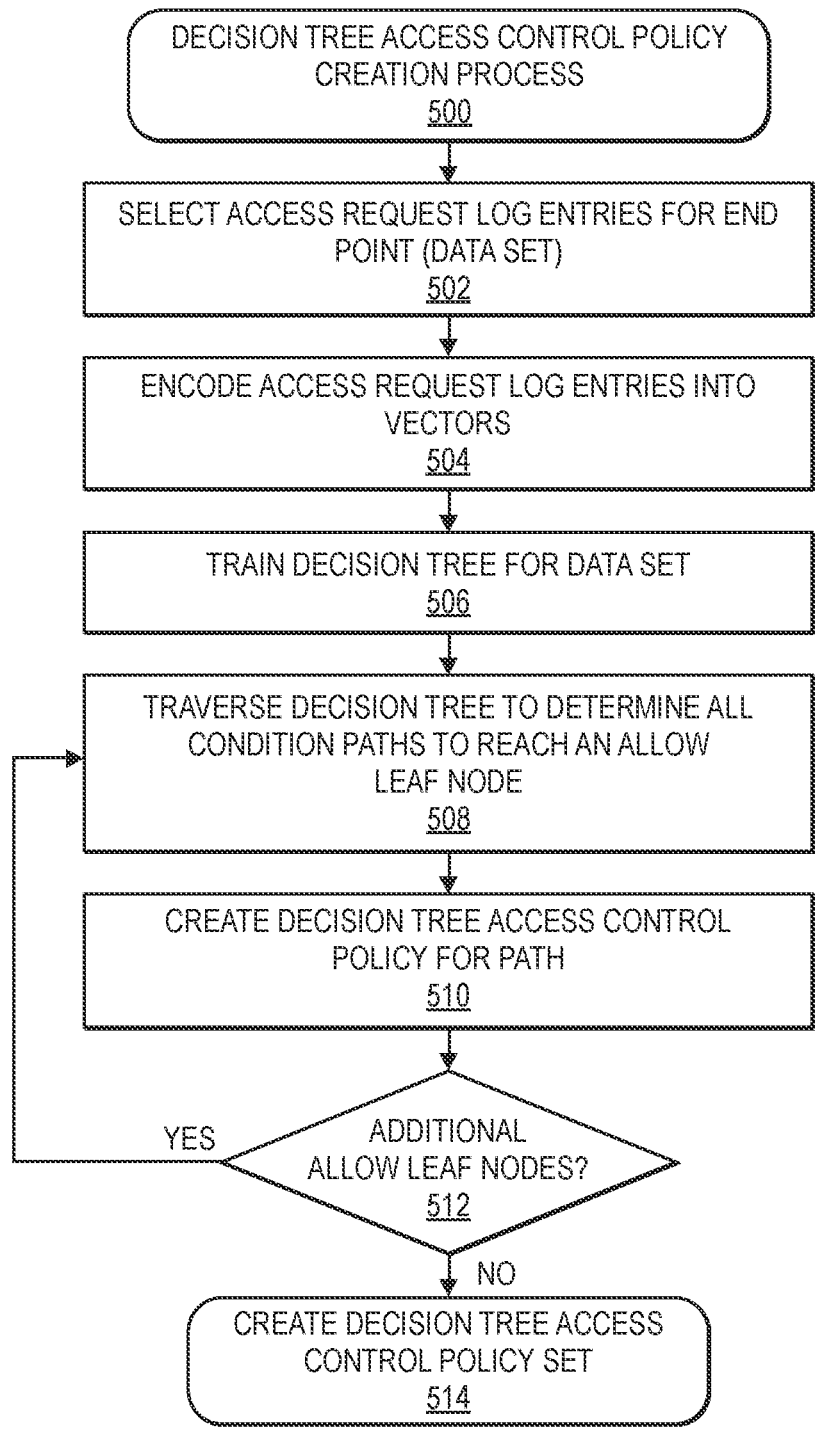
FIG. 5 is an example decision tree access control policy creation process, in accordance with disclosed implementations.

FIG. 5 is an example decision tree access control policy creation process 500, in accordance with disclosed implementations.

The example process 500 begins by selecting access request log entries (data set) for an endpoint, as in 502. As discussed above, access request log entries may be collected over a period of time for an endpoint.

To enable processing of the access request log entries by a decision tree, each access request log entry is encoded into a vector, such as a vector of reals, that represents the access request log entry, as in 504.

Utilizing the vectors representative of the access request log entries of the data set, a machine learning ("ML") model may be trained to generate a decision tree in which each non-leaf node of the decision tree corresponds to a criteria or condition of an access request log entry and each leaf node of the decision tree corresponds to a result (allow or deny) of an access request log entry, as in 506. In some implementations, the ML model may be trained using supervised learning. In other implementations, the ML model may be trained using semi-supervised learning or non-supervised learning. An example process of training the ML model using supervised learning is discussed further below with respect to FIG. 6.

Upon generation of a decision tree, the decision tree may be interpreted into access control policies by navigating paths through the decision tree to reach an allow result, as in 508. For example, if access control policies are all accept policies, an access control policy may be interpreted from the decision tree by traversing a path through each node of the decision tree to reach an allow leaf node. The conditions or criteria of each non-leaf node navigated through the decision tree to reach the allow leaf node may be included in the access control policy for that allow policy, as in 510. Decision tree traversal and interpretation may be done for each allow leaf node and a respective access control policy generated.

For example, upon generation of an access control policy for an allow leaf node, it may be determined whether there are additional allow leaf nodes for which an access control policy is to be generated, as in 512. If it is determined that there are additional allow leaf nodes for which an access control policy is to be created, the example process returns to block 508 and continues. If it is determined that there are no additional allow leaf nodes to process, the example process 500 creates a decision tree access control policy set that includes each of the access control policies determined by the example process 500, as in 514.

As discussed above, the decision tree access control policy set and/or some or all of the access control policies generated by the example process 500 may be utilized as example access control policies that are provided as a prompt to LLM(s) as part of generating an access control policy set for an endpoint.

Figure 6:
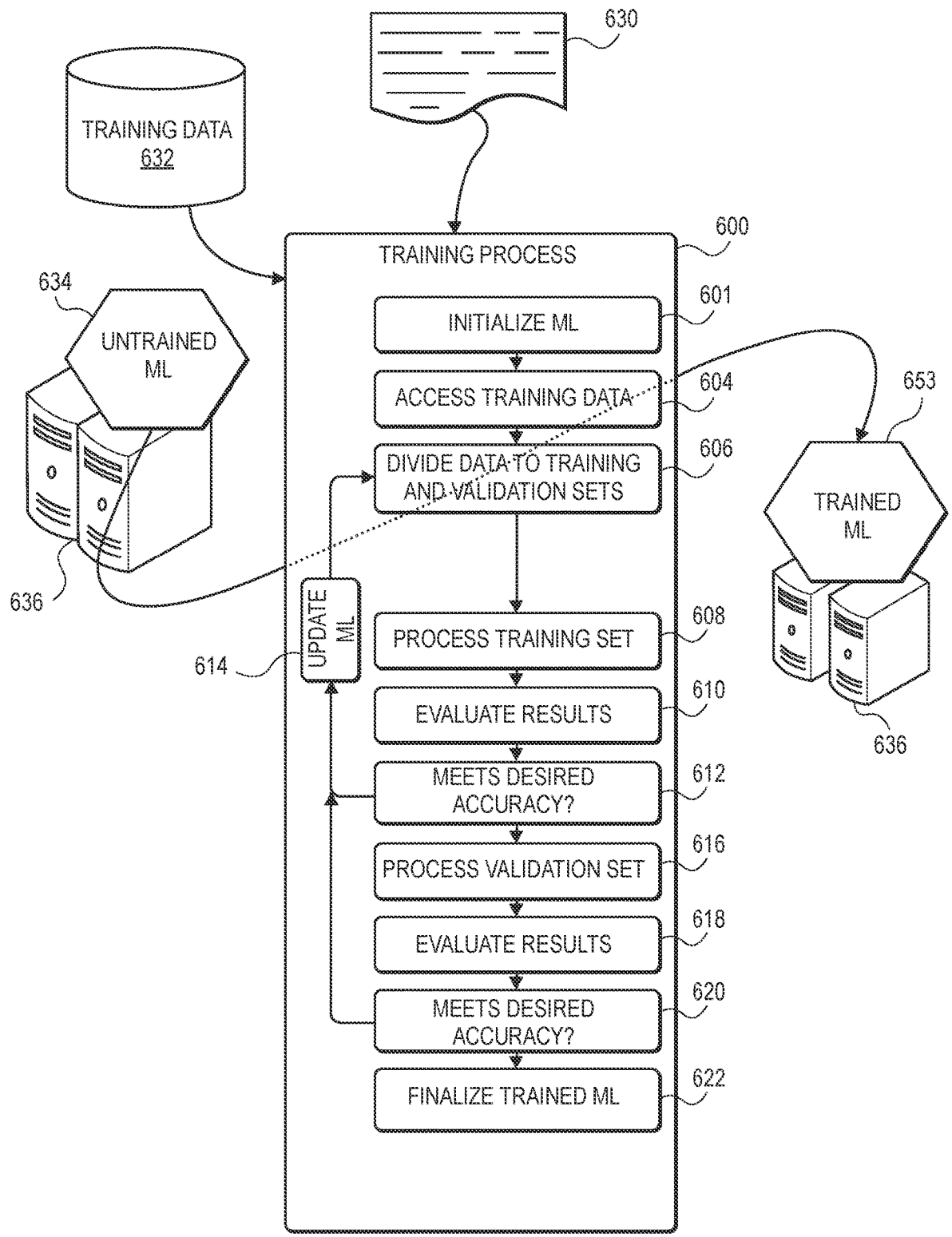
FIG. 6 illustrates an exemplary overall process of training a machine learning model, in accordance with disclosed implementations.

FIG. 6 illustrates an exemplary overall process 600 of training a ML model, such as the herein discussed decision tree model, in accordance with aspects of the disclosed subject matter. Indeed, as shown in FIG. 6, the training process 600 is configured to train an untrained ML model 634 operating on a computer system 636 to transform the untrained ML model into a trained ML model 653 that operates on the same or another computer system, such as a remote computing resource 636. In the course of training, as shown in the training process 600, at step 601, the untrained ML model 634 is initialized with training criteria 630. Training criteria 630 may include, but is not limited to, information as to a type of training, and number of layers to be trained, etc.

At step 604 of training process 600, a corpus of training data 632, such as vectors generated from the access request log entries as discussed above, is accessed. For example, if training is to generate a trained ML model 653 that generates a decision tree, the training data 632 may include the vectors generated from the access request log entries with labels corresponding to the decisions (allow or deny) included in those access request log entries. While the disclosed implementations discuss the use of labeled training data, in various implementations, the training data 632 may also or alternatively include unlabeled training data.

With the training data 632 accessed, at step 606 the training data is divided into training and validation sets. Generally speaking, the items of data in the training set are used to train the untrained ML model 634 and the items of data in the validation set are used to validate the training of the ML model. As those skilled in the art will appreciate, and as described below in regard to much of the remainder of training process 600, there are numerous iterations of training and validation that occur during the training of the ML model.

At step 608 of the training process, the data items of the training set are processed, often in an iterative manner. Processing the data items of the training set include capturing the processed results. After processing the items of the training set, at step 610, the aggregated results of processing the training set are evaluated, and at step 612, a determination is made as to whether a desired accuracy level has been achieved. If the desired accuracy level is not achieved, in step 614, aspects of the ML model are updated in an effort to guide the ML model to generate more accurate results, and processing returns to step 606, where a new set of training data is selected, and the process repeats. Alternatively, if the desired accuracy level is achieved, the training process 600 advances to step 616.

At step 616, and much like step 608, the data items of the validation set are processed, and at step 618, the processing accuracy of this validation set is aggregated and evaluated. At step 620, a determination is made as to whether a desired accuracy level, in processing the validation set, has been achieved. If the desired accuracy level is not achieved, in step 614, aspects of the ML model are updated in an effort to guide the ML model to generate more accurate results, and processing returns to step 606. Alternatively, if the desired accuracy level is achieved, the training process 600 advances to step 622.

At step 622, a finalized, trained ML model 653 is generated. Typically, though not exclusively, as part of finalizing the now-trained ML model 653, portions of the ML model that are included in the model during training for training purposes are extracted, thereby generating a more efficiently trained ML model 653.

Figure 7:
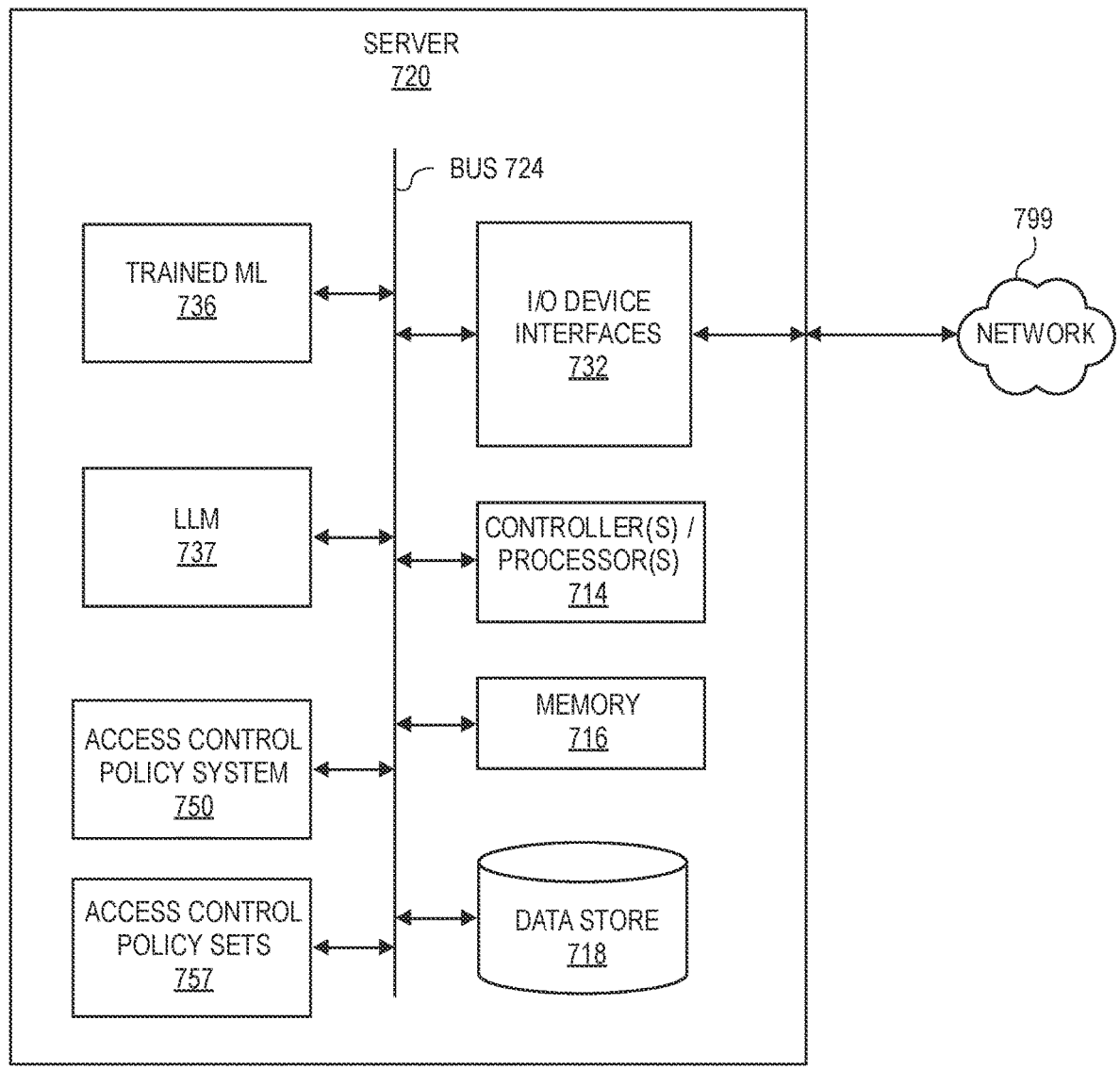
FIG. 7 illustrates example components of a server, in accordance with disclosed implementations.

FIG. 7 is a block diagram conceptually illustrating example components of a remote computing device, such as a remote server 720 that may include and/or execute one or more of the above discussed implementations. Multiple such servers 720 may be included in the system.

Each of these server(s) 720 may include one or more controllers/processors 714, that may each include a central processing unit (CPU) for processing data and computer-readable instructions, and a memory 716 for storing data and instructions. The memory 716 may individually include volatile random access memory (RAM), non-volatile read only memory (ROM), non-volatile magnetoresistive random access memory (MRAM) and/or other types of memory. Each server may also include a data storage component 718, for storing data, controller/processor-executable instructions, training data, labels, access request log entries, access control policy sets, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 799 (e.g., the Internet) through respective input/output device interfaces 732.

Computer instructions for operating each server 720 and its various components may be executed by the respective server's controller(s)/processor(s) 714, using the memory 716 as temporary "working" storage at runtime. A server's computer instructions may be stored in a non-transitory manner in non-volatile memory 716, storage 718, and/or an external device(s). Alternatively, some or all of the executable instructions may be embedded in hardware or firmware on the respective device in addition to or instead of software.

Each server 720 includes input/output device interfaces 732. A variety of components may be connected through the input/output device interfaces. Additionally, each server 720 may include an address/data bus 724 for conveying data among components of the respective server. Each component within a server 720 may also be directly connected to other components in addition to (or instead of) being connected to other components across the bus 724. Each server may also include one or more trained ML models 736, one or more LLMs 737, the access control policy system 750, and/or the access control policy sets 757, as discussed herein.

The components of the server(s) 720, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 3, 5, and 6, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    obtaining a data set that includes a plurality of access request log entries indicative of access requests to an endpoint and resulting decisions on the access request;
    generating, from the data set:
        a first random sample set that includes a first sub-plurality of access request log entries randomly selected from the data set that is less than the plurality of access request log entries of the data set; and
        a second random sample set that includes a second sub-plurality of access request log entries randomly selected from the data set that is less than the plurality of access request log entries of the data set;
    processing, with at least one Large Language Model ("LLM"):
        the first random sample set to generate a first candidate access control policy that covers at least some of the first sub-plurality of access request log entries included in the first random sample set; and
        the second random sample set to generate a second candidate access control policy that covers at least some of the second sub-plurality of access request log entries included in the second random sample set;
    determining a first percentage of the plurality of access request log entries of the data set covered by the first candidate access control policy;
    determining a second percentage of the plurality of access request log entries of the data set covered by the second candidate access control policy;
    selecting, based at least in part on the first percentage and the second percentage, a first access control policy for the endpoint as the first candidate access control policy;
    generating, from the data set, a reduced data set that excludes each of the plurality of access request log entries of the data set that are covered by the first access control policy and includes, from the data set, a second plurality of access request log entries not covered by the first access control policy;
    generating, from the reduced data set:
        a third random sample set that includes a third sub-plurality of access request log entries randomly selected from the reduced data set that is less than the second plurality of access request log entries of the reduced data set; and
        a fourth random sample set that includes a fourth sub-plurality of access request log entries randomly selected from the reduced data set that is less than the second plurality of access request log entries of the reduced data set;
    processing, with the at least one LLM:
        the third random sample set to generate a third candidate access control policy that covers at least some of the third sub-plurality of access request log entries included in the third random sample set; and
        the fourth random sample set to generate a fourth candidate access control policy that covers at least some of the fourth sub-plurality of access request log entries included in the fourth random sample set;
    determining a third percentage of the second plurality of access request log entries of the reduced data set covered by the third candidate access control policy;
    determining a fourth percentage of the plurality of access request log entries of the reduced data set covered by the fourth candidate access control policy;
    selecting, based at least in part on the third percentage and the fourth percentage, a second access control policy for the endpoint as the third candidate access control policy; and
    defining an access control policy set for the endpoint that includes at least the first access control policy and the second access control policy.

2. The computer-implemented method of claim 1, further comprising:
    providing, to the at least one LLM as part of processing, the first random sample set and the second random sample set:
        at least one example access control policy; and
        instructions to generate the first candidate access control policy and the second candidate access control policy based at least in part on the at least one example access control policy.

3. The computer-implemented method of claim 1, further comprising:
    providing, to the at least one LLM as part of processing the third random sample set and the fourth random sample set:
        at least one of the first candidate access control policy or the second candidate access control policy; and
        instructions to generate the third candidate access control policy and the fourth candidate access control policy based at least in part on the at least one of the first candidate access control policy or the second candidate access control policy.

4. The computer-implemented method of claim 1, further comprising:
generating, from the reduced data set, a fifth random sample set that includes a fifth sub-plurality of access request log entries randomly selected from the reduced data set that is less than the second plurality of access request log entries of the reduced data set;
processing the fifth random sample set with the LLM to generate a fifth candidate access control policy that covers at least some of the fifth sub-plurality of access request log entries included in the fifth random sample set;
determining that the fifth candidate access control policy is to be excluded from consideration; and
discarding the fifth candidate access control policy.

5. The computer-implemented method of claim 4, wherein determining that the fifth candidate access control policy is to be excluded from consideration includes:
determining, at least one of:
that the fifth candidate access control policy has an invalid syntax; or
that the fifth candidate access control policy allows an access request indicated in an access request log entry of the plurality of access request log entries of the data set that should be denied.

6. A computing system, comprising:
one or more processors; and
a memory storing program instructions that, when executed by the one or more processors, causes the one or more processors to at least:
generate, from a data set that includes a plurality of access request log entries, a plurality of sample sets, each of the plurality of sample sets including a sub-plurality of the plurality of access request log entries of the data set;
generate, for each of the plurality of sample sets, a candidate access control policy that covers at least some of the access request log entries of the sample set;
determine, for each candidate access control policy, a coverage score indicative of a percentage of the plurality of access request log entries of the data set covered by the candidate access control policy;
select a candidate access control policy having a highest coverage score as a first access control policy; and
monitor, with the first access control policy, a plurality of future access requests.

7. The computing system of claim 6, wherein the program instructions that, when executed by the one or more processors to generate, for each of the plurality of sample sets, a candidate access control policy, further include instructions that cause the one or more processors to at least:
process a first sample set of the plurality of sample sets with a first Large Language Model ("LLM") to generate a first candidate access control policy; and
process a second sample set of the plurality of sample sets with at least one of the first LLM or a second LLM to generate a second candidate access control policy.

8. The computing system of claim 7, wherein the program instructions that, when executed by the one or more processors, further include instructions that cause the one or more processors to at least:
provide an example access control policy to the LLM with instructions to generate the first candidate access control policy based at least in part on the example access control policy.

9. The computing system of claim 8, wherein the program instructions that, when executed by the one or more processors, further include instructions that cause the one or more processors to at least:
generate, based at least in part on the plurality of access request log entries, a decision tree that includes a plurality of nodes and a plurality of leaves, wherein at least some of the leaves are allow leaves indicative of a decision to allow an access request;
traverse the decision tree to an allow leaf to determine a path through nodes of the decision tree to reach the allow leaf; and
generate the example access control policy based at least in part on the traversal through the decision tree.

10. The computing system of claim 6, wherein the program instructions that, when executed by the one or more processors, further cause the one or more processors to at least:
generate a second plurality of sample sets, each of the second plurality of sample sets including a second sub-plurality of the plurality of access request log entries of the data set;
generate, for each of the second plurality of sample sets, a second candidate access control policy that covers at least some of the access request log entries of the sample set;
determine, for each second candidate access control policy, a second coverage score indicative of a second percentage of the plurality of access request log entries of the data set covered by the second candidate access control policy;
select a second candidate access control policy having a second highest coverage score as a second access control policy; and
monitor, with the first access control policy and the second access control policy, the plurality of future access requests.

11. The computing system of claim 10, wherein the program instructions that, when executed by the one or more processors, further cause the one or more processors to at least:
generate, from the data set, a reduced data set that excludes each of the plurality of access request log entries of the data set that are covered by the first access control policy and includes, from the data set, a second plurality of access request log entries not covered by the first access control policy; and
wherein the sub-plurality of the plurality of access request log entries included in each of the second plurality of sample sets are included in the reduced data set.

12. The computing system of claim 10, wherein the program instructions that, when executed by the one or more processors to generate, for each of the second plurality of sample sets, a second candidate access control policy, further include instructions that cause the one or more processors to at least:
process a first sample set of the second plurality of sample sets with a first Large Language Model ("LLM") to generate a first candidate access control policy; and
process a second sample set of the second plurality of sample sets with at least one of the first LLM or a second LLM to generate a second candidate access control policy.

13. The computing system of claim 12, wherein the program instructions that, when executed by the one or more processors, further include instructions that cause the one or more processors to at least:
provide the first access control policy to the LLM with instructions to generate the first candidate access control policy based at least in part on the first access control policy.

14. The computing system of claim 6, wherein:
one or more of the sub-plurality of the plurality of access request log entries are allow access request log entries in which the access request was allowed;
one or more of the sub-plurality of the plurality of access request log entries are deny access request log entries in which the access request was denied; and
the program instructions that, when executed by the one or more processors to generate, for each of the plurality of sample sets, a candidate access control policy, further include instructions that, when executed by the one or more processors, further cause the one or more processors to at least:
generate, for each of the plurality of sample sets, a candidate access control policy that allows as many of the allow access request log entries of the sample set as possible without allowing a deny access request log entry of the sample set.

15. A method, comprising:
generating, from a data set that includes a plurality of access request log entries, a first sample set that includes a first sub-plurality of the plurality of access request log entries of the data set;
generating, from the data set, a second sample set that includes a second sub-plurality of the plurality of access request log entries of the data set;
generating, based at least in part on the first sample set, a first candidate access control policy that covers at least some of the access request log entries of the first sample set;
generating, based at least in part on the second sample set, a second candidate access control policy that covers at least some of the access request log entries of the second sample set;
determining a first coverage score indicative of a first percentage of the plurality of access request log entries of the data set covered by the first candidate access control policy;
determining a second coverage score indicative of a second percentage of the plurality of access request log entries of the data set covered by the second candidate access control policy;
selecting, based at least in part on the first coverage score and the second coverage score, the first candidate access control policy as a first access control policy; and
monitoring, with the first access control policy, a plurality of future access requests.

16. The method of claim 15, further comprising:
generating, from the data set, a third sample set that includes a third sub-plurality of the plurality of access request log entries of the data set;
generating, based at least in part on the third sample set, a third candidate access control policy that covers at least some of the access request log entries of the third sample set; and
determining that the third candidate access control policy allows a first access request indicated by a first access request log entry of the plurality of access request log entries that should be denied; and
wherein selecting the first candidate access control policy as the first access control policy is further based at least in part on the first coverage score, the second coverage score, and the determination that the third candidate access control policy allows the first access request.

17. The method of claim 15, further comprising:
generating a third sample set that includes access request log entries of the data set that are not covered by the first access control policy;
generating, based at least in part on the third sample set, a third candidate access control policy that covers at least some of the access request log entries of the third sample set;
selecting the third candidate access control policy as a second access control policy; and
monitoring, with the first access control policy and the second access control policy, the plurality of future access requests.

18. The method of claim 17, wherein generating the third candidate access control policy further includes:
providing the third sample set to a Large Language Model ("LLM") as part of an LLM input, wherein the LLM input includes an example access control policy and instructions to generate, based at least in part on the third sample set and the example access control policy, the third candidate access control policy.

19. The method of claim 18, wherein the example access control policy is the first access control policy.

20. The method of claim 15, further comprising:
providing the first sample to a first large language model ("LLM") that generates the first candidate access control policy; and
providing the first sample set to a second LLM that generates a third candidate access control policy, wherein the first LLM is a first type of LLM and the second LLM is a second type of LLM that is different than the first type of LLM.

* * * * *